(12) United States Patent
Kesler

(10) Patent No.: US 12,161,263 B1
(45) Date of Patent: Dec. 10, 2024

(54) ARTICULATING OUTDOOR GRILL

(71) Applicant: Brent Kesler, Burleson, TX (US)

(72) Inventor: Brent Kesler, Burleson, TX (US)

( * ) Notice: Subject to any disclaimer, the term of this patent is extended or adjusted under 35 U.S.C. 154(b) by 339 days.

(21) Appl. No.: 17/580,467

(22) Filed: Jan. 20, 2022

Related U.S. Application Data

(60) Provisional application No. 63/139,344, filed on Jan. 20, 2021.

(51) Int. Cl.
*A47J 37/07* (2006.01)

(52) U.S. Cl.
CPC ............................. *A47J 37/0772* (2013.01)

(58) Field of Classification Search
CPC . A47J 37/0772; A47J 33/00; A47J 2037/0795
USPC .................. 126/25 R, 9 R, 25 AA, 29, 30
See application file for complete search history.

(56) References Cited

U.S. PATENT DOCUMENTS

| | | | | |
|---|---|---|---|---|
| 3,094,113 A | * | 6/1963 | Avila | A47J 37/0763 126/30 |
| 3,162,113 A | * | 12/1964 | Tallaksen | A47J 37/0763 126/30 |
| 5,117,806 A | * | 6/1992 | Soat | A47J 33/00 99/449 |
| 10,506,886 B1 | * | 12/2019 | Winters | A47F 5/108 |
| 2008/0289511 A1 | * | 11/2008 | Mendez | A47J 36/22 99/357 |

* cited by examiner

*Primary Examiner* — Vivek K Shirsat
(74) *Attorney, Agent, or Firm* — James E. Walton

(57) ABSTRACT

An articulating outdoor grill includes a central post that everything is attached to. A upper and lower support member which have slideable coupling members configured to engage and interlock with each other. A basket support which is configured to be slidingly disposed over the central post. A basket assembly where food will be cooked. A basket tong which have a first set and a second set of basket hooks.

17 Claims, 24 Drawing Sheets

ARTICULATING OUTDOOR GRILL

This application claims the benefit of U.S. Provisional Application No. 63/139,344, filed 20 Jan. 2021, titled "Articulating Outdoor Grill," which is incorporated by reference herein for all purposes.

BACKGROUND

1. Field of the Invention

The present invention relates generally to cooking equipment that can be used to cook food over an open flame while being able to support cooking equipment.

2. Description of Related Art

Every year thousands of people head into the wilderness in order to go camping and experience the great outdoors for themselves. During their stay they are likely to partake in cooking their food over a fire. Typically this can involve holding the food over the fire with poles or using something to hold a pot or pan over the fire while the food cooks. One issue with this is that people are limited in what they can cook out over the fire by what they can set up. They are also limited as to how well they can cook their food over the fire by the tools they have available. These are just some of the problems confronted by this outdoor grill. There is a constant need for improvement in this and other aspects of such grills.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Like reference symbols in the various drawings indicate like elements.

DETAILED DESCRIPTION OF THE PREFERRED EMBODIMENT

Illustrative embodiments of the articulating outdoor grill according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
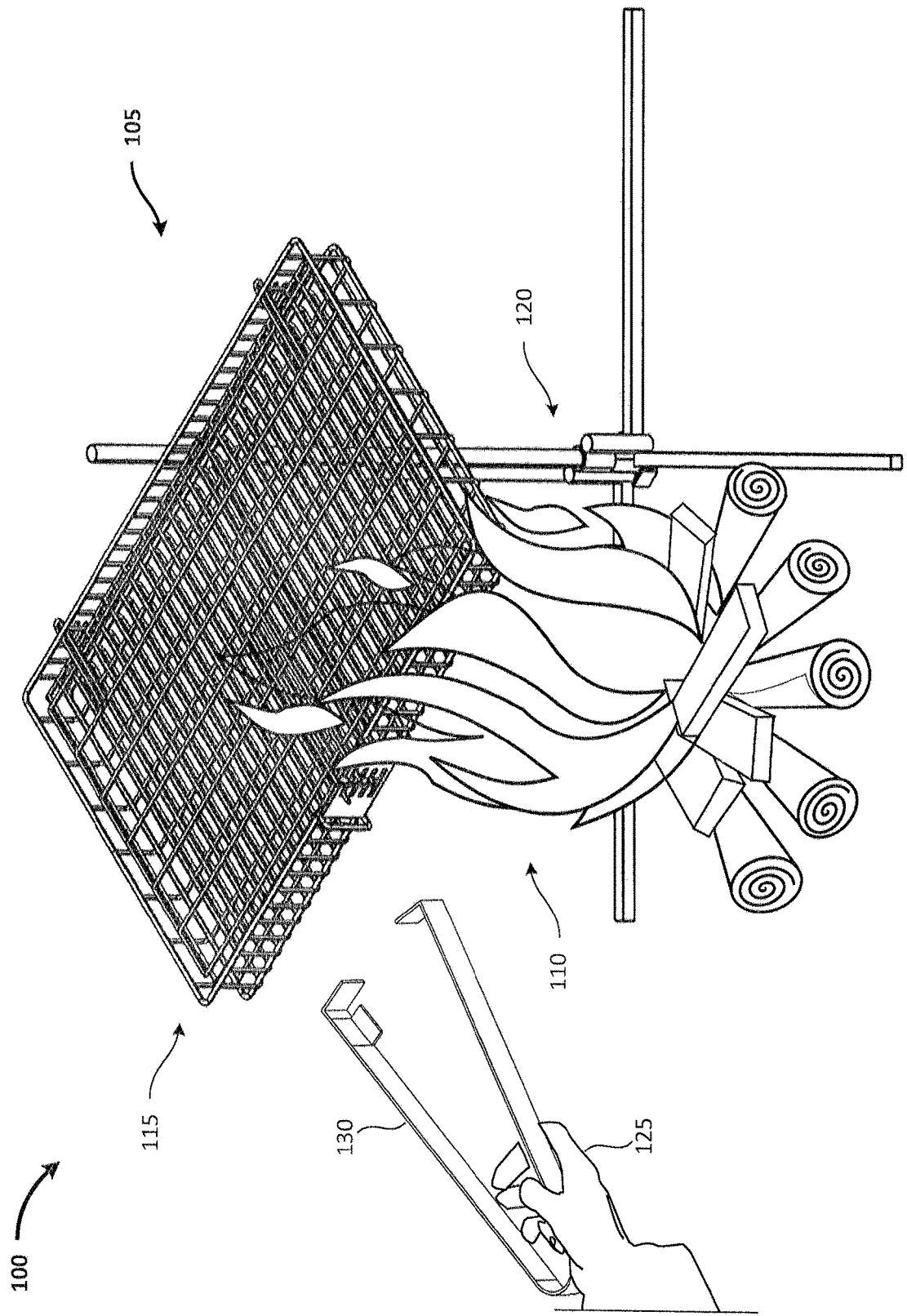
FIG. 1 depicts an exemplary articulating outdoor grill employed in an illustrative use case scenario.

FIG. 1 depicts an exemplary articulating outdoor grill employed in an illustrative use case scenario. In the exemplary grilling scenario 100, an exemplary articulating outdoor grill 105 is used, for example, to grill food over a campfire 110. The articulating outdoor grill 105 supports a basket assembly 115 over the campfire 110 by a basket support assembly 120. A user 125 may, for example, manipulate the basket assembly 115 using basket tongs 130. By way of example and not limitation, the user 125 use the basket tongs 130 to rotate the basket assembly 115 to expose a different surface to the fire 110, to rotate the basket assembly 115 to an opposite side of the basket support assembly 120 and away from the campfire 110, open the basket assembly 115, or some combination thereof. Accordingly, the articulating outdoor grill 105 may advantageously allow a user to conveniently cook food in the basket assembly 115 over an open campfire 110. In various embodiments, the articulating outdoor grill 105 may advantageously allow the user 125 to position food in a desired location over the campfire 110, to expose a desired portion of the food to the campfire 110, to easily access and manipulate food over the campfire 110, to allow food to cool after cooking, or some combination thereof. A clamp on light can also be used in order for the user 125 to better see what they are doing if they are cooking at night.

Figure 2:
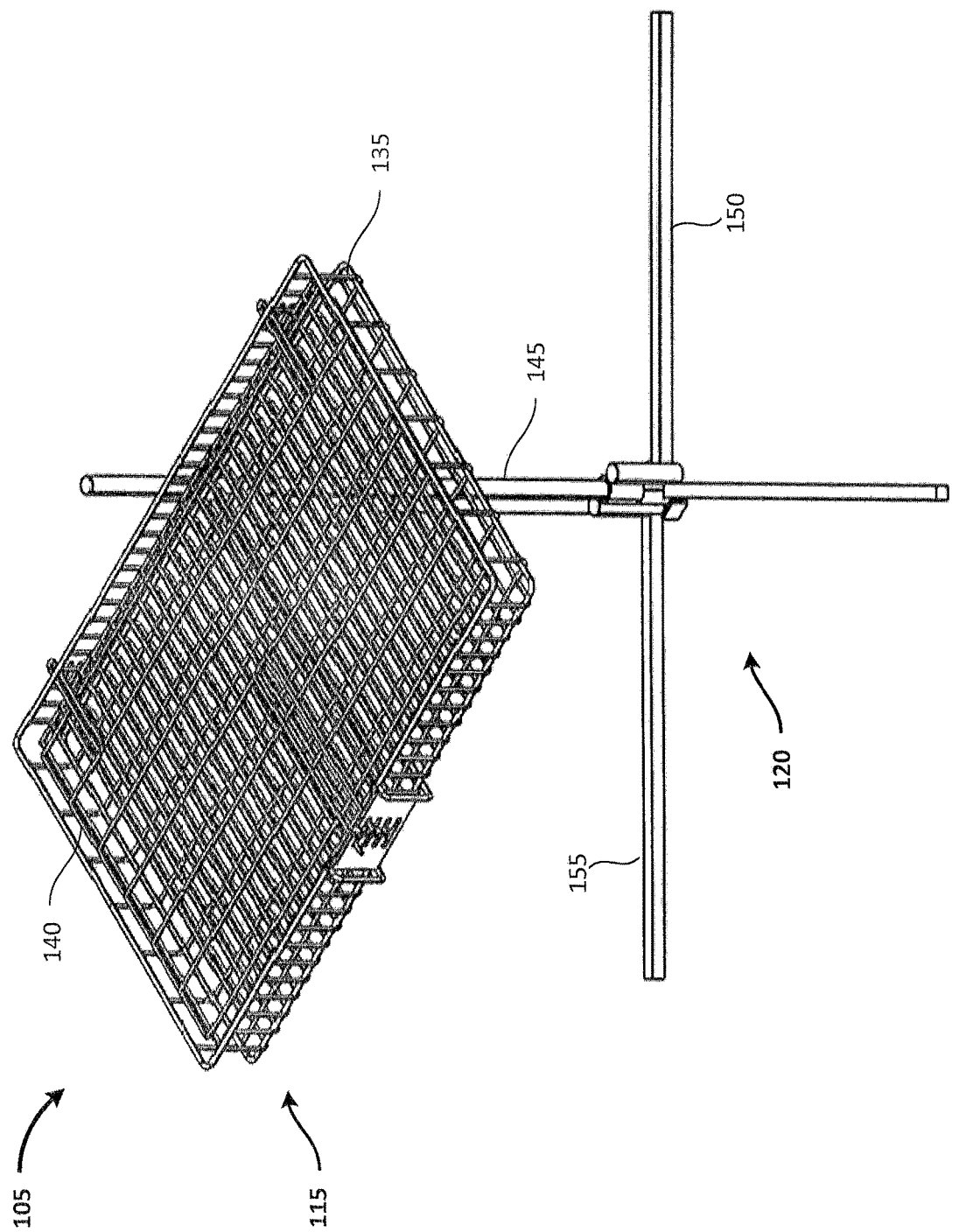
FIG. 2 depicts a top front right perspective view of an exemplary articulating outdoor grill.
Figure 3:
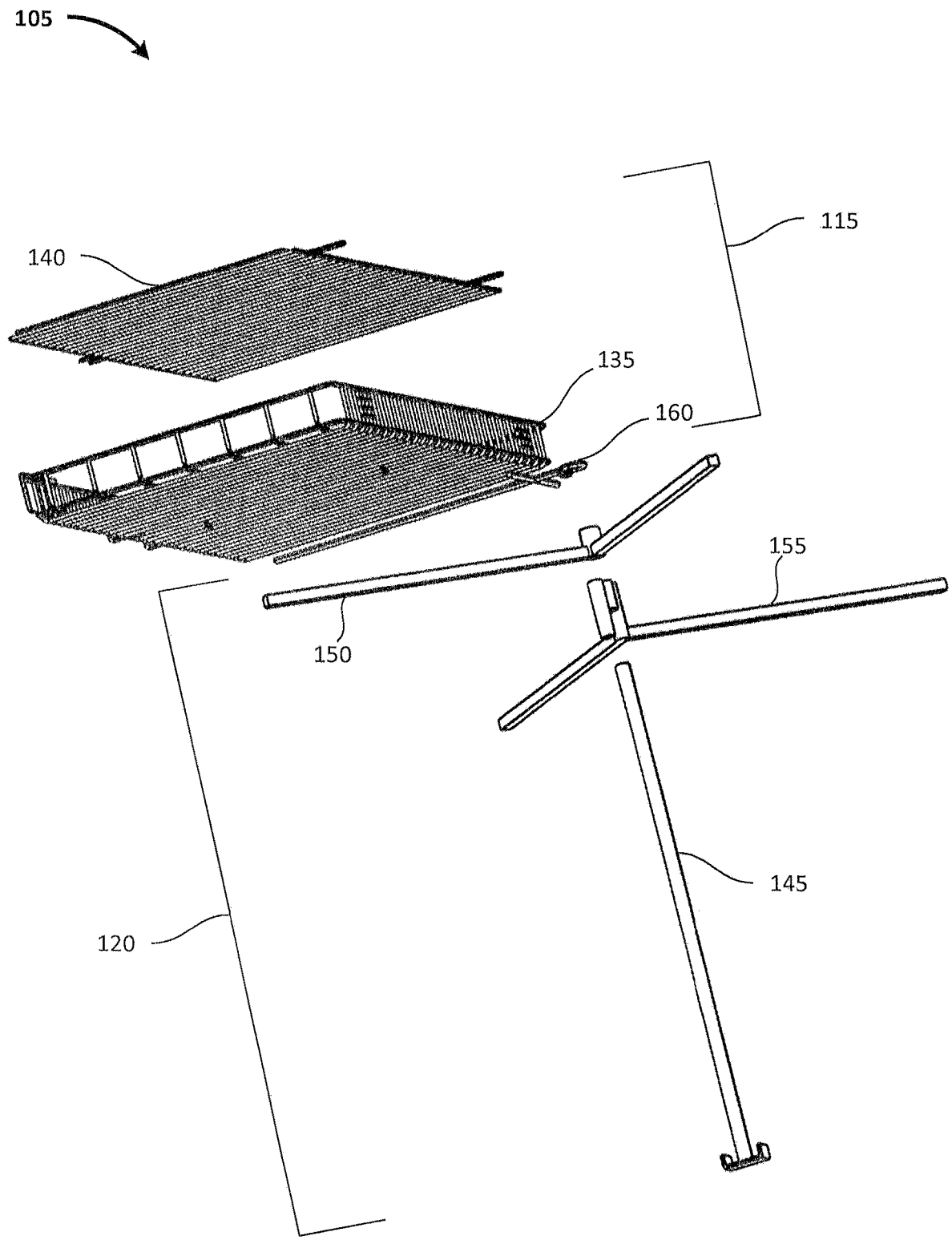
FIG. 3 depicts an exploded view of the exemplary articulating outdoor grill of FIG. 2.
Figure 4:
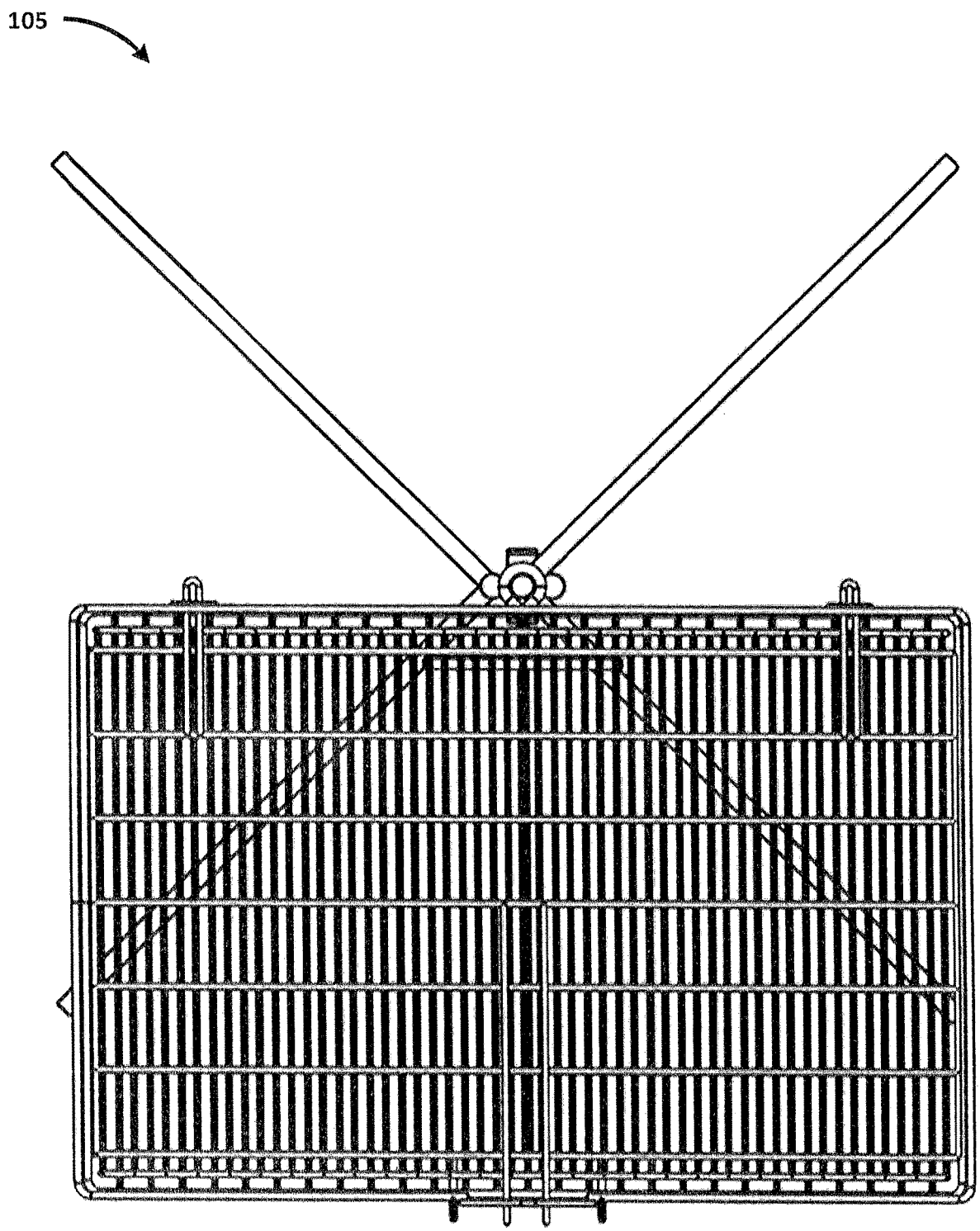
FIG. 4 depicts a top plan view of the exemplary articulating outdoor grill of FIG. 2.
Figure 5:
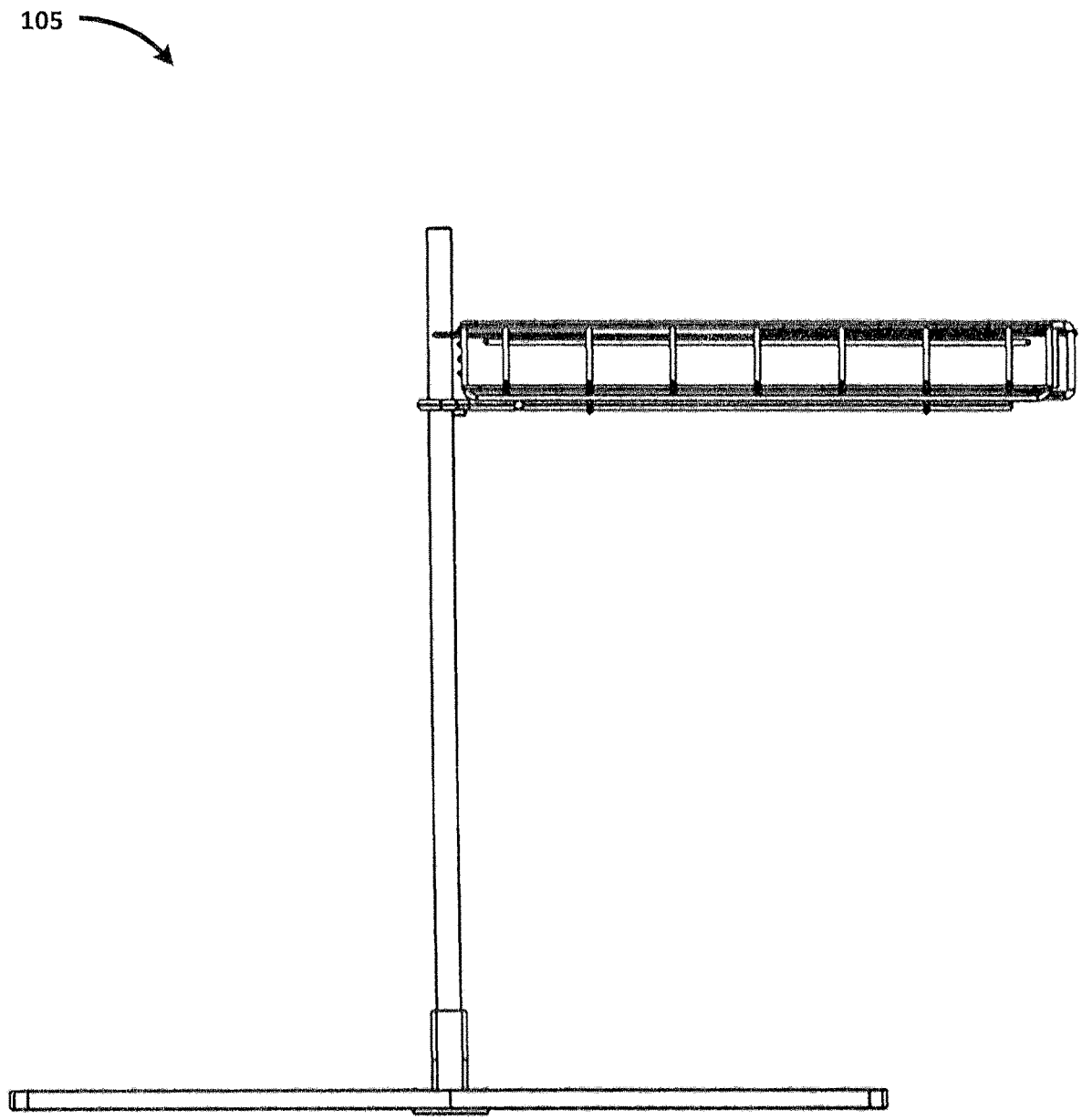
FIG. 5 depicts a left elevation view of the exemplary articulating outdoor grill of FIG. 2.
Figure 6:
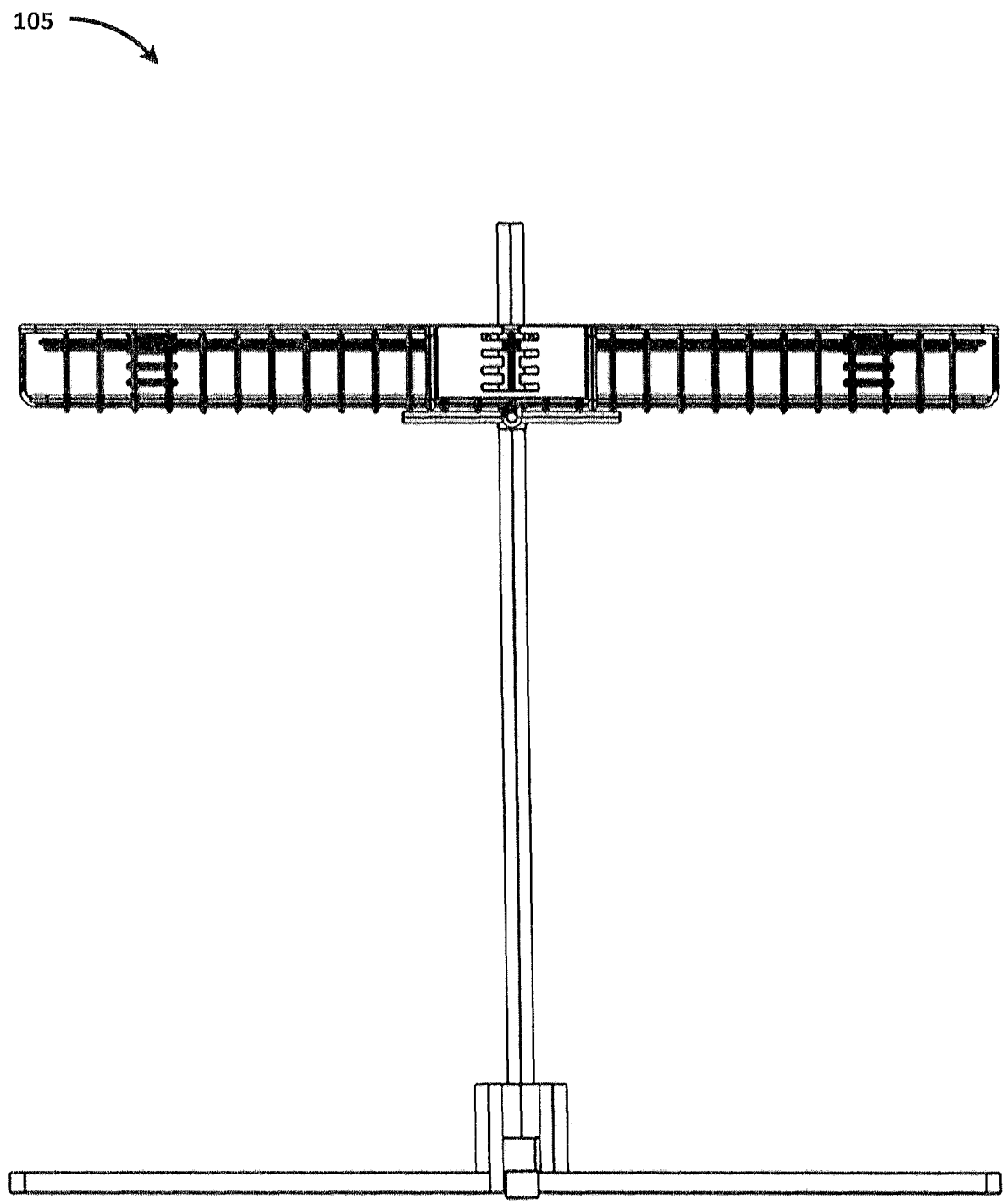
FIG. 6 depicts a front elevation view of the exemplary articulating outdoor grill of FIG. 2.
Figure 7:
FIG. 7 depicts a rear elevation view of the exemplary articulating outdoor grill of FIG. 2.
Figure 8:
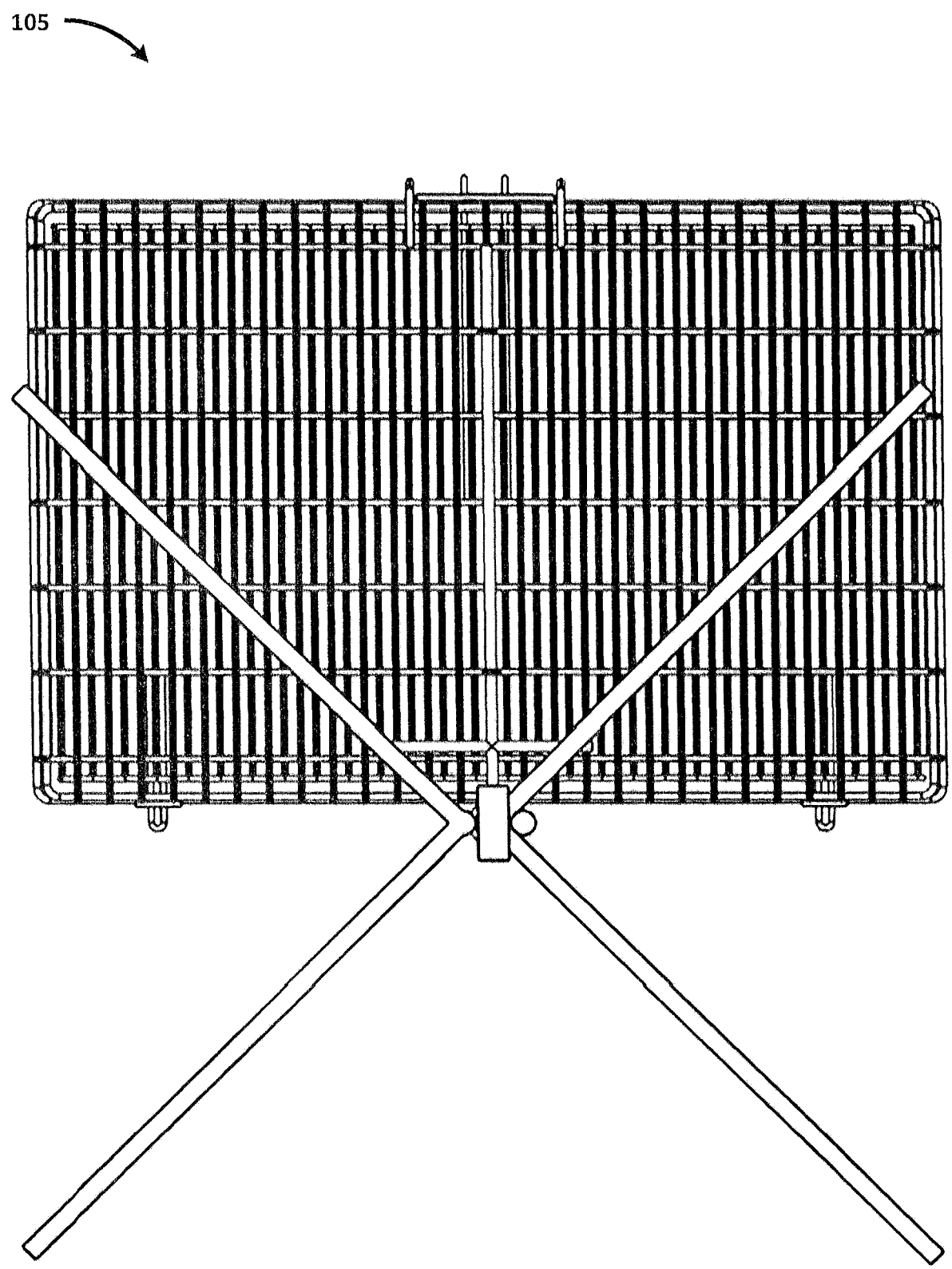
FIG. 8 depicts a bottom plan view of the exemplary articulating outdoor grill of FIG. 2.
Figure 9:
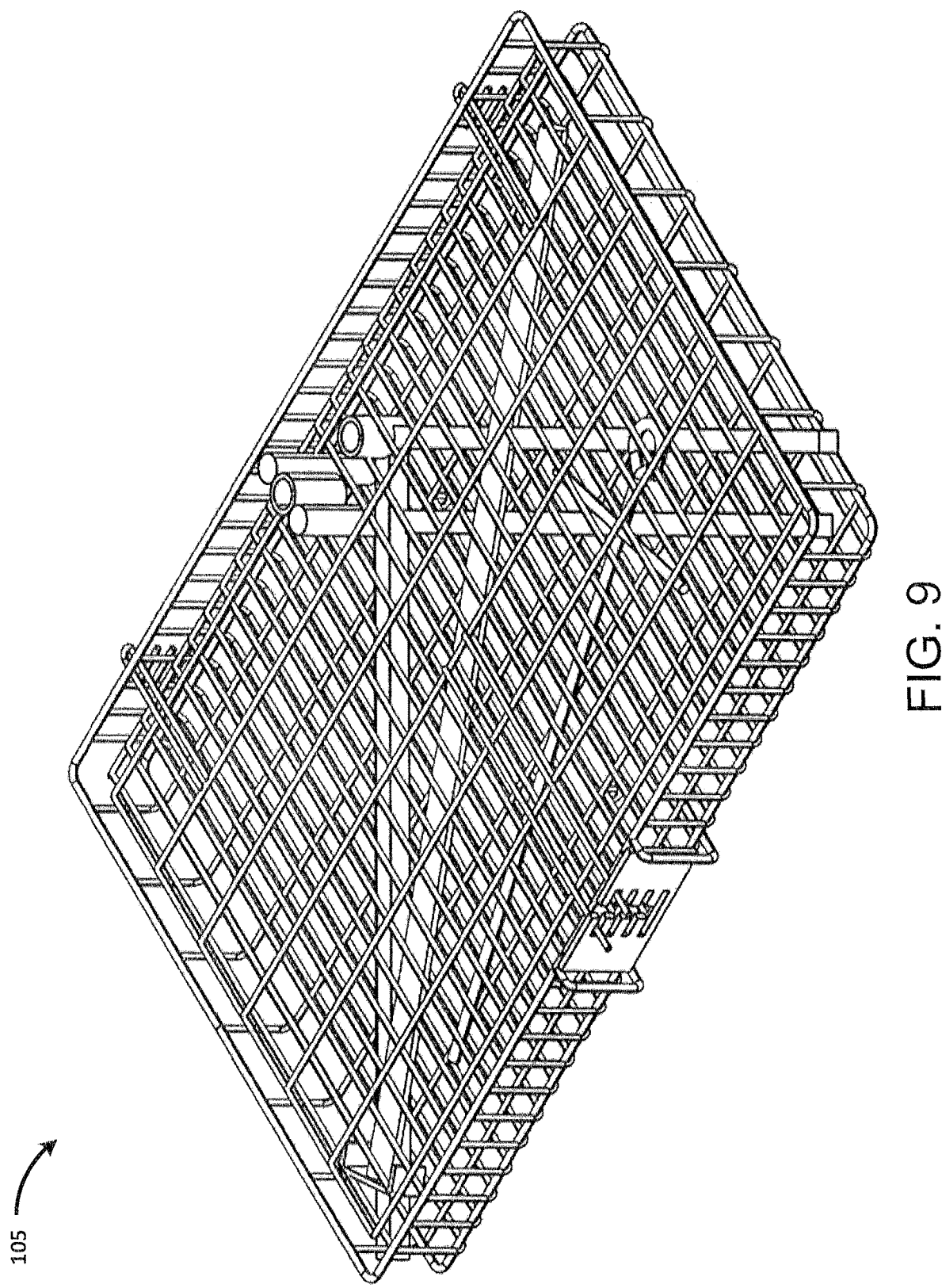
FIG. 9 depicts a perspective view of the exemplary articulating outdoor grill of FIG. 2 in an exemplary stowage mode.

FIG. 2 depicts a top front right perspective view of an exemplary articulating outdoor grill. FIG. 3 depicts an exploded view of the exemplary articulating outdoor grill of FIG. 2. FIG. 4 depicts a top plan view of the exemplary articulating outdoor grill of FIG. 2. FIG. 5 depicts a left elevation view of the exemplary articulating outdoor grill of FIG. 2. FIG. 6 depicts a front elevation view of the exemplary articulating outdoor grill of FIG. 2. FIG. 7 depicts a rear elevation view of the exemplary articulating outdoor grill of FIG. 2. FIG. 8 depicts a bottom plan view of the exemplary articulating outdoor grill of FIG. 2. FIG. 9 depicts a perspective view of the exemplary articulating outdoor grill of FIG. 2 in an exemplary stowage mode. The articulating outdoor grill 105 includes a basket assembly 115 and the basket support assembly 120. The basket assembly 115 includes a basket 135 and a basket lid 140. The basket support assembly 120 includes a central post 145, a lower support member 150 and an upper support member 155. Central post 145 can either be a continuous post or in alternative embodiment the height of the post can be variable. In a deployed mode, the respective components of the basket support assembly 120 in the basket assembly 115 may be assembled to support the basket assembly 115 as shown, for example, in FIG. 2. In a stowage mode, the basket support assembly 120 may be disassembled into its respective components and stored within the basket assembly 115 such as is shown, for example, in FIG. 9. Accordingly, the articulating outdoor grill 105 may be advantageously transitioned between a deployed mode (e.g., over an energy source, in a location for serving food), transported (e.g., in a backpack, vehicle, recreational vehicle) and/or stored (e.g., in a vehicle, garage, attic, storage building).

Figure 10A:
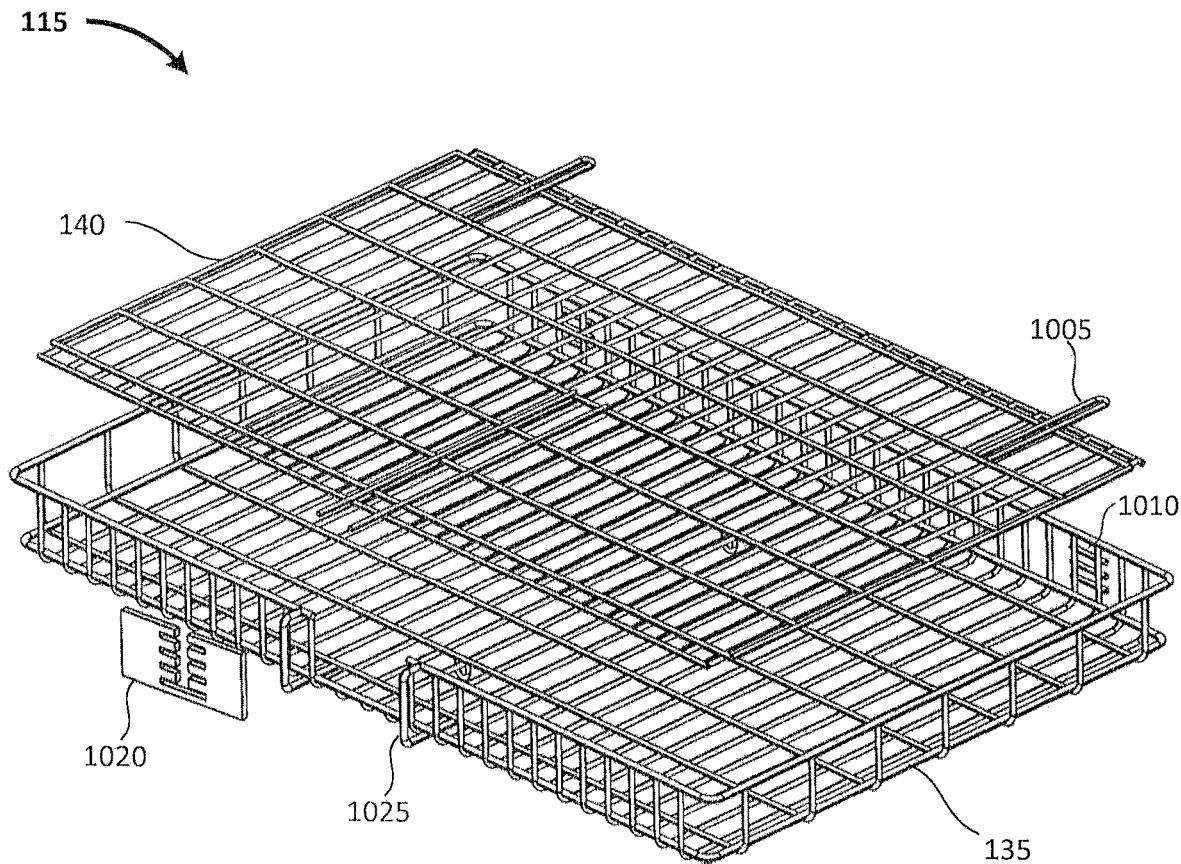
FIG. 10A and FIG. 10B depict perspective exploded views of an exemplary basket assembly of the exemplary articulating outdoor grill of FIG. 2.
Figure 10B:
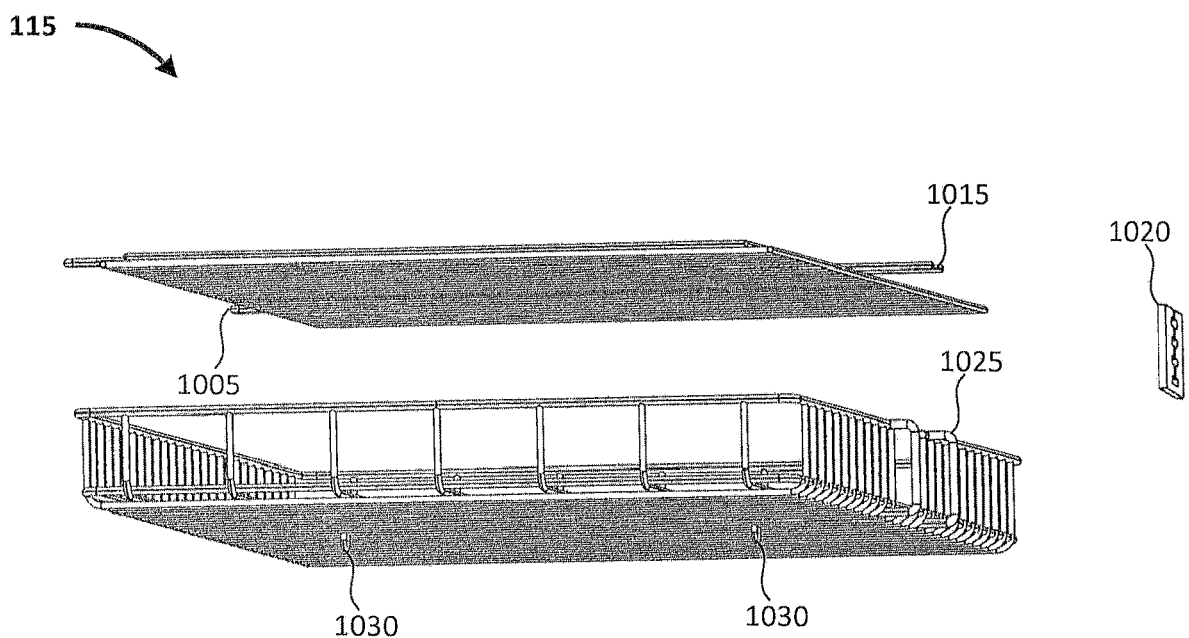

FIG. 10A and FIG. 10B depict perspective exploded views of an exemplary basket assembly of the exemplary articulating outdoor grill of FIG. 2. The basket lid 140 is provided with left and right rear protruding engagement members 1005. The engagement members 1005 are configured to be inserted into corresponding coupling features 1010 of basket 135. The basket lid 140 is also provided with latching member 1015. The latching member 1015 is configured to adjustably engage a latching plate 1020. The latching plate 1020 is coupled to a front surface of the basket 135. As depicted, the latching plate 1020 is coupled to the basket 135 between a left and a right manipulation feature 1025. The manipulation members 1025 may, for example, be configured for a user to advantageously engage with basket tongs (e.g., 130 of FIG. 1). Accordingly, the lid 140 may be releasably coupled to the basket 135 by slidingly and releasably engaging the engagement members 1005 into the corresponding coupling features 1010 engaging the latching member 1015 into the latching plate 1020.

The basket 135 is further provided with basket support members 1030. In the depicted example, a plurality of basket support members 1030 are provided such that the basket 135 maybe slidably and rotatably coupled two and supported by the basket support 160. Various embodiments may, by way of example and not limitation, have more than two basket support members 1030, or a single basket support member 1030 (e.g., positioned in a center of the basket 135 front-to-back, a tube having a length greater than a diameter of a lumen configured to be disposed over the basket support 160). In some embodiments, the basket support members 1030 may be disposed on the basket 135 (as depicted), on a surface of the basket 135 other than the bottom, on the lid 140, or some combination thereof. In an alternative embodiment, there could be an adjustable basket support member 1800.

In the depicted example, the coupling features 1010 may, for example, be a vertical series of slots configured to receive a corresponding engagement member 1005. The latching plate 1020 may have a series of slots extending laterally from a central aperture. the latching members 1015 may, as depicted, be at least two members secured to the lid 140 at a proximal end and spaced apart search that they may be urged towards each other to be inserted inside the central aperture of the latching plate 1020 and then released to engage a corresponding pair of lateral slots in the latching plate 1020. Accordingly, a user may advantageously position the lid 140 in a plurality of positions relative to the basket 135. A user may, for example, advantageously use the lid 140 to define an adjustable cavity bounded by the basket 135 and the lid 140. For example, the lid 140 may be used to releasably secure food in a desired configuration within the basket 135.

In various embodiments, by way of example and not limitation, the latching elements 1015, the engagement members 1005, the lid 140, the basket 135, the manipulation members 1025, the coupling members 1010, the basket coupling members 1030, or some combination thereof may be formed from metal stock (e.g., wire, rod), cast, punched, stamped, or some combination thereof. For example, metal rod and/or heavy-gauge wire may be formed and welded. Various components (e.g., latching plate 1020, coupling features 1010, engagement members 1005, basket coupling members 1030) may be cut, stamped, and/or formed from metal stock. The latching plate 1020 may, for example, be welded and/or adhered to the basket 135. In various embodiments, other materials may be used, for example, which are appropriate to an intended temperature (e.g., cooking, smoking, drying, chilling).

Figure 11:
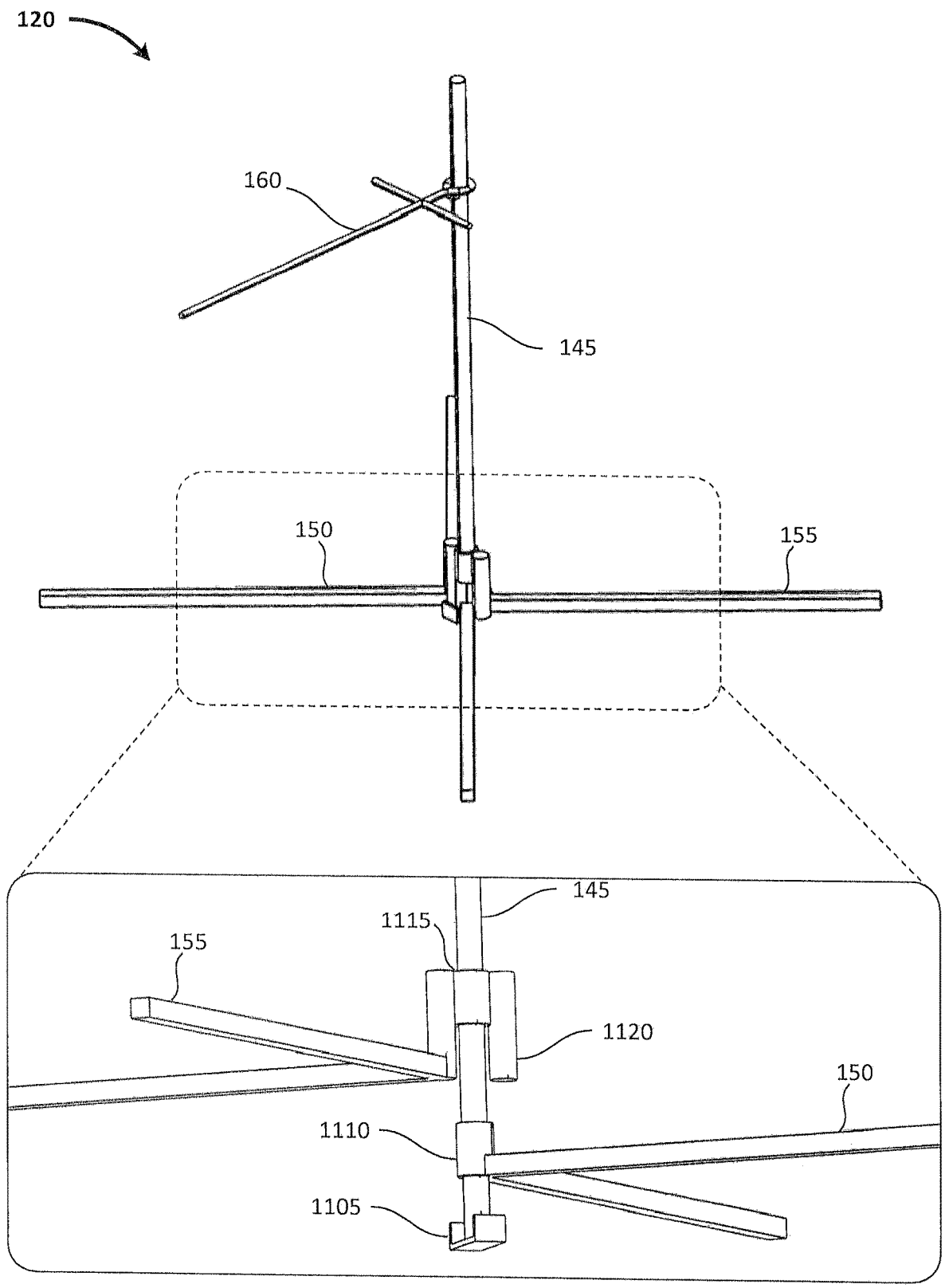
FIG. 11 depicts a perspective view of an exemplary stand assembly of the exemplary articulating outdoor grill of FIG. 2.

FIG. 11 depicts a perspective view of an exemplary stand assembly of the exemplary articulating outdoor grill of FIG. 2. In a deployed configuration of the stand assembly 120, the central post 145 is releasably and slidably engaged with the lower support member 150 and the upper support element 155. The basket supporting 160 is rotatably and slidably engaged to the central post 145. Accordingly, a basket assembly (not shown) may be rotatably supported over a heat source by the stand assembly 120.

Figure 12:
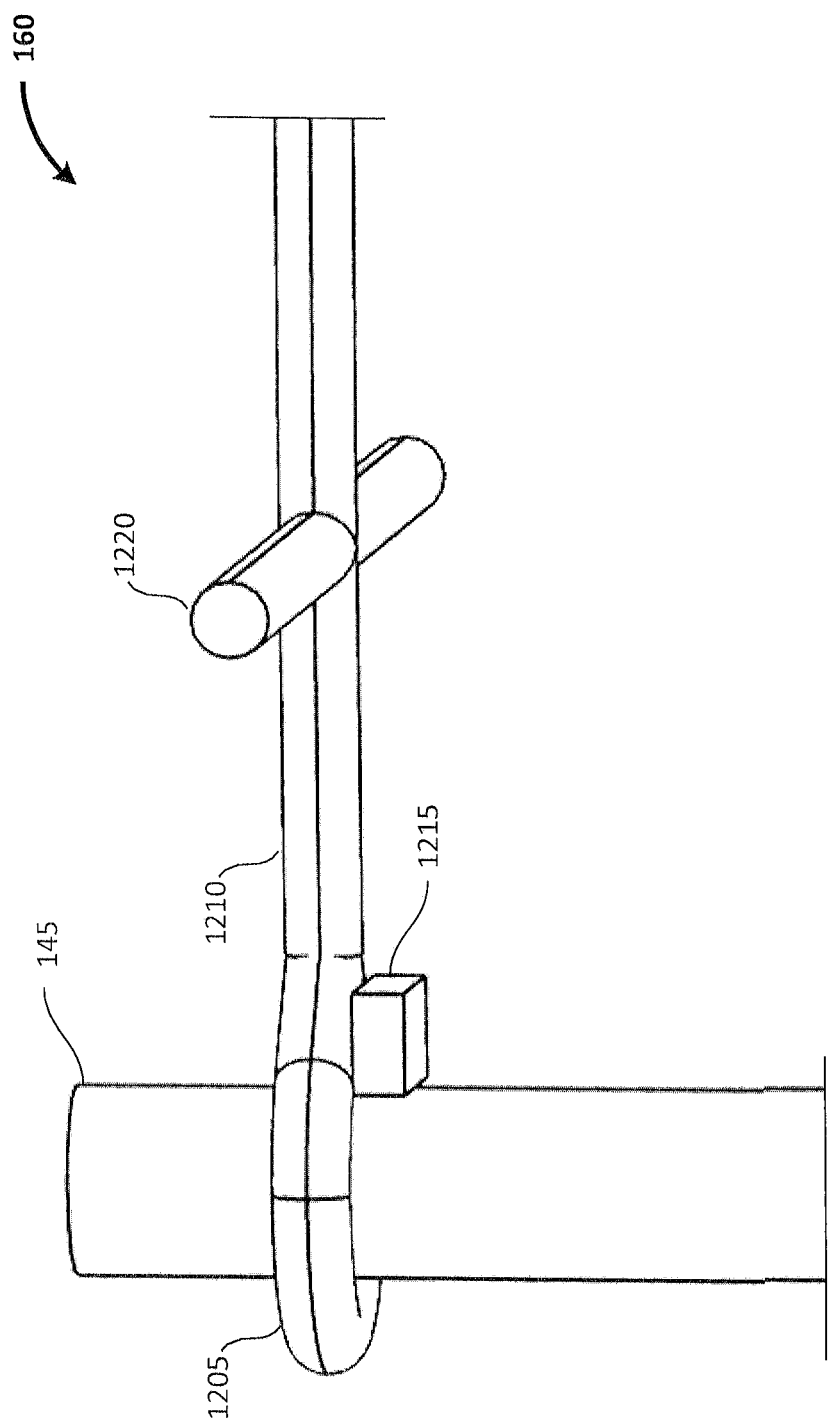
FIG. 12 depicts a close-up perspective view of an exemplary basket support of the articulating outdoor grill of FIG. 2.

The central post 145 is provided with an engagement member 1105. The lower support number 150 is provided with a slidable coupling member 1110. The upper support member 155 is provided with a slidable coupling member 1115 and a locking member 1120 configured to slidably engage and interlock with the lower support member 150 and the coupling member 1105 of the central post 145. Accordingly, when transitioning the stand assembly 120 from a stowage mode to a deployed mode, the engagement member 1110 of the lower support member 150 may be slidably disposed over the central post 145 until the coupling member 1110 contacts the engagement member 1105. The upper support member 155 may then be slidably disposed over the central post 145 until the coupling member 1115 contacts the coupling member 1110. The upper support member 155 is oriented such that the locking member 1120 interlocks with the legs of lower support member 150 and the engagement member 1105 of the central post 145. Accordingly, the central post 145, the lower support member 150, and the upper support member 155 may be assembled and releasably coupled in a deployed mode to form a basket support assembly 120 configured to support a basket (e.g., basket assembly 115). The engagement member 1105 and the locking member 1120 may, for example, advantageously prevent rotation of the central post 145 relative to the upper support member 155 in the lower support member 150 during manipulation of the basket support 160. An alternative embodiment of these support members could use stakes to project into the ground itself to keep the system stable FIG. 12 depicts a close-up perspective view of an exemplary basket support of the articulating outdoor grill of FIG. 2. In the depicted example, the basket support 160 is provided with a coupling member 1205 configured to be slidingly disposed over the central post 145. A central support arm 1210 extends from the coupling member 1205. The central support arm 1210 may be configured to slidably and rotatably engage the basket coupling members 1030. The basket support 160 is further provided with a locking member 1215 disposed on an underside of the basket support 160 and positioned to engage a surface of the central post 145 when a downward force is applied to the basket support 160. Accordingly, locking member 1215 may releasably engage the central post 145 such that coupling member 1205 is releasably secured relative to the central post 145. The locking member 1215 may be positioned relative to the coupling member 1205 such that the central support arm 1210 is substantially perpendicular to the central support post 145 when the basket 135 is supported by the central support arm 1210.

The basket support 160 is further provided with first and second lateral support members 1220 extending from the central support arm 1210. The lateral support members 1220 may, for example, be configured to contact an underside of a basket (e.g., basket 135) when the central support arm 1210 is slightly engaged within the basket coupling members 1030. Accordingly, when the basket 135 is slid towards the central post 145 relative to the central support arm 1210, the lateral support members 1220 may prevent rotation of the basket 135 about the central support arm 1210. When the basket 135 is slid away from the central post 145 relative to the central support arm 1210 such that the basket 135 is no longer in contact with the lateral support members 1220, the basket 135 may be, for example, rotated about the central support arm 1210. Accordingly, the basket may, for example, advantageously be rotated to expose a new surface to a heat source, and then slid on the central support arm 1210 back towards the central post 145 such that the lateral support members 1220 again prevent rotation of the basket 135 about the central support arm 1210.

In various embodiments, the coupling member 1205 may be unitarily formed with the central support arm 1210, as depicted. The locking member 1215 may, as depicted, be secured (e.g., welded) as a separate element to the coupling member 1205. In various embodiments the coupling member 1205 in the locking number 1215 may be combined into a single element. For example, the coupling member 1205 may be a vertically extending tube defining a lumen configured to receive the central post 145. The coupling member 1205 may be configured such that the top edge and/or a bottom edge engage the central post 145 when a downward movement 1225 is applied to the central support arm 1210.

Accordingly, the coupling member 1205 may advantageously serve as both a coupling member and a locking member. In such embodiments, the coupling member 1205 may be canted relative to the central support arm 1210 such that an axis passing through the center of the lumen of the coupling member 1205 may form an acute angle relative to an upper surface of the central support arm 1210 and an obtuse angle relative to a lower surface of the central support arm 1210. The degree of canting may, for example, be configured such that the central support arm 1210 is substantially perpendicular to the central support arm 145 when the basket 135 is supported thereby.

Figure 13:
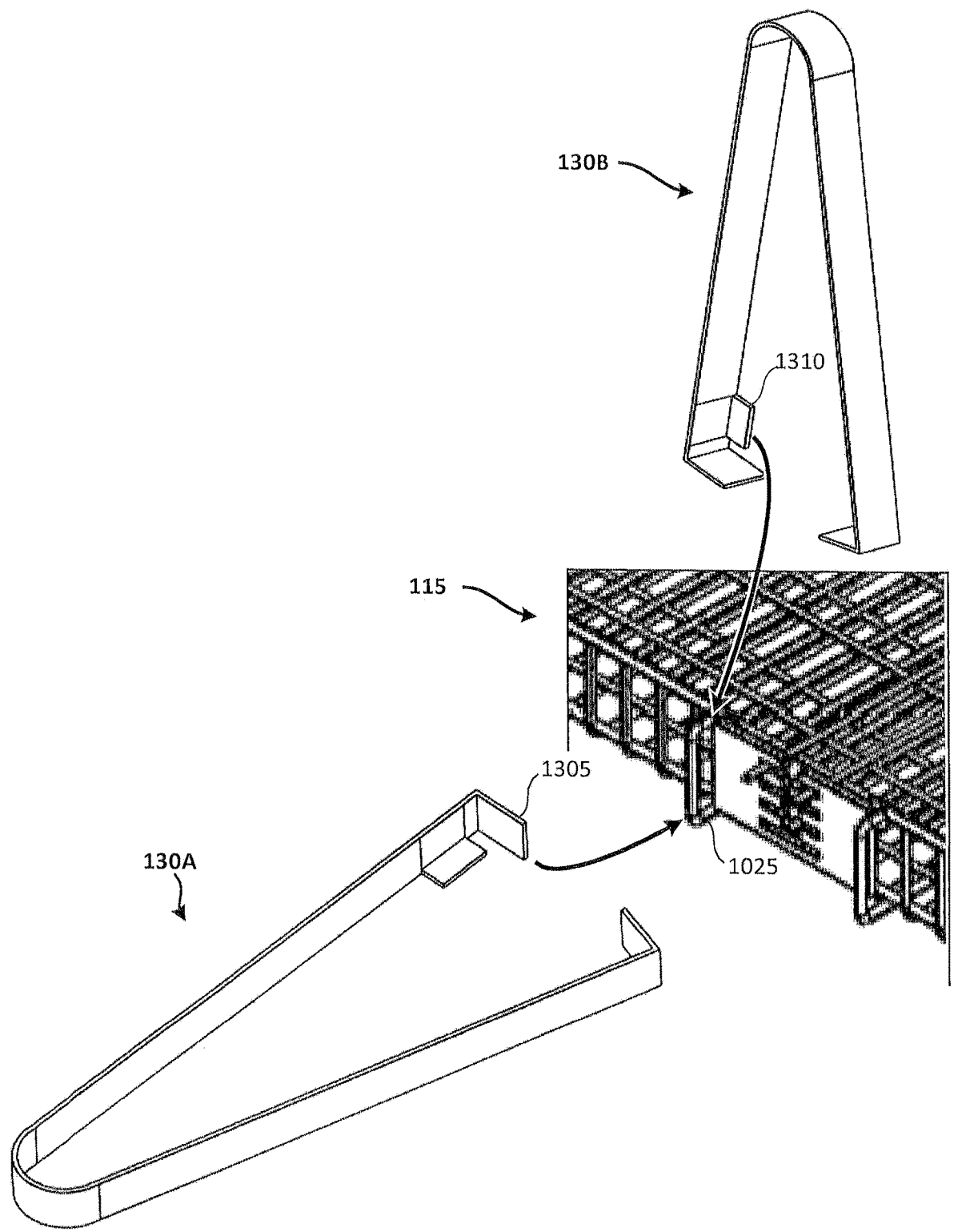
FIG. 13 depicts an exemplary basket tongs in two exemplary positions for manipulating an exemplary basket assembly of the exemplary articulating outdoor grill of FIG. 2.
Figure 14:
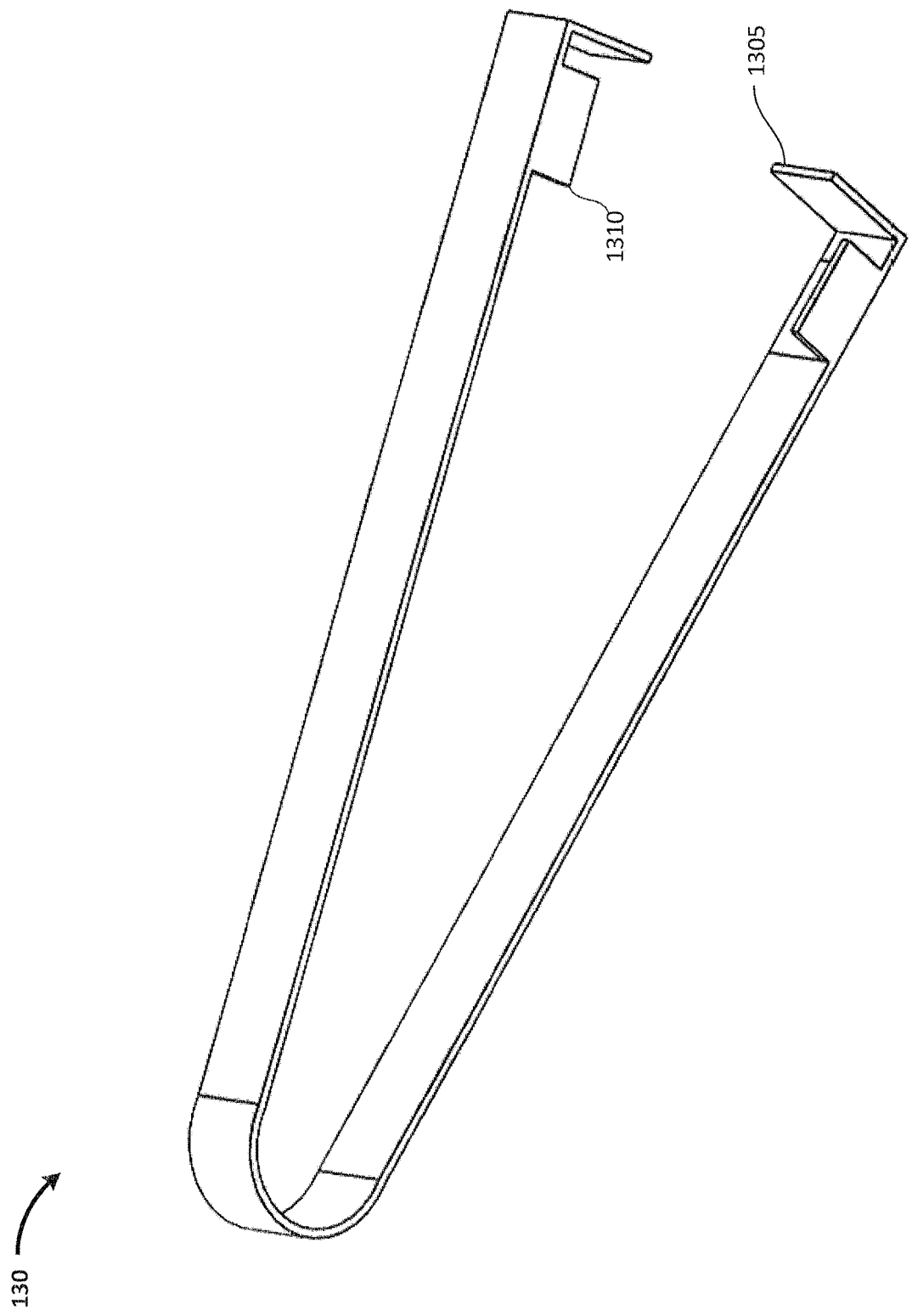
FIG. 14 depicts a bottom perspective view of the exemplary basket tongs of FIG. 13.

FIG. 13 depicts an exemplary basket tongs in two exemplary positions for manipulating an exemplary basket assembly of the exemplary articulating outdoor grill of FIG. 2. FIG. 14 depicts a bottom perspective view of the exemplary basket tongs of FIG. 13. The basket tongs 130 are provided with the first set a basket hooks 1305 and a second set of basket hooks 1310. The first set of basket hooks 1305 extend inward towards each other from a distal edge of the tongs 130. The second set of basket hooks 1310 extend inward towards each other from a bottom edge of the tongs 130 proximal to the first set of basket hooks 1305 such that a space separates the first set of basket hooks 1305 and the second set of basket hooks 1310. The basket tongs 130 are shown in a first position 130A and a second position 130B. In the first position 130A, the first set of basket hooks 1305 are oriented to engage the basket manipulation members 1025. In the second position 130B, the second set of basket hooks 1310 are oriented to engage the basket manipulation members 1025. Accordingly, a user may advantageously releasably engage and manipulate the basket 115 using the basket tongs 130 from a preferred position. The basket tongs 130 may also be used, for example, to manipulate the lid 140, to operate the latching members 1015, or some combination thereof. In a stowage mode (e.g., as shown in FIG. 9), the tongs 130 may be disposed within the basket assembly 105. In various embodiments the tongs 130 may be advantageously cut and/or formed from a single sheet of material (e.g., steel).

Figure 15:
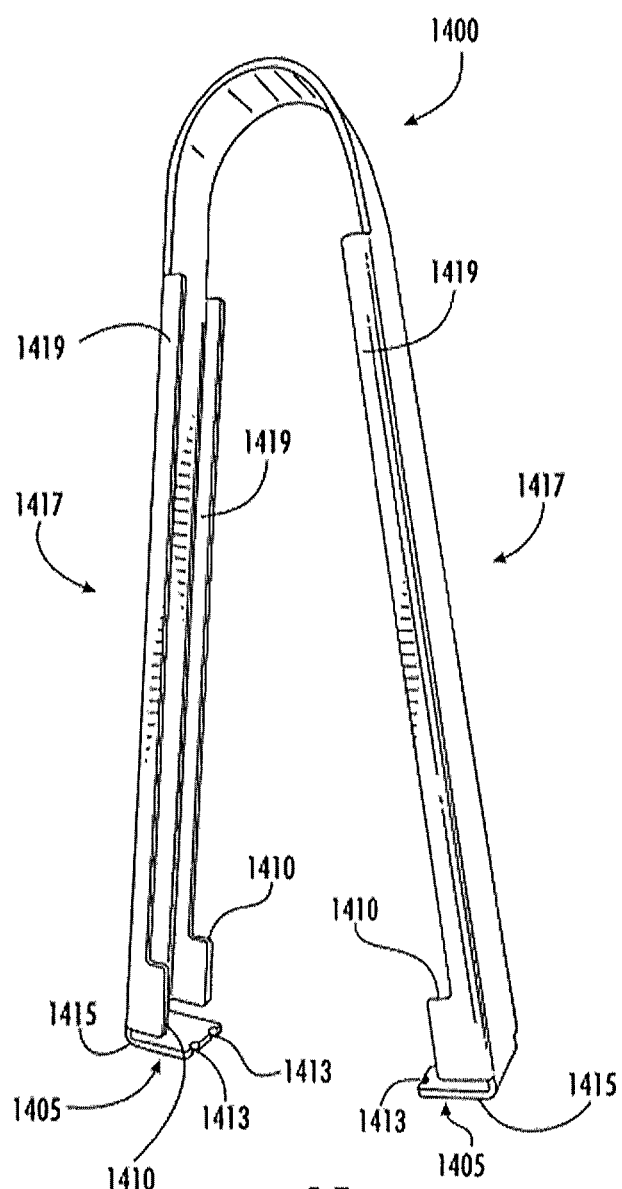
FIG. 15 depicts a front perspective view of an alternative embodiment of the exemplary basket tongs.
Figure 16:
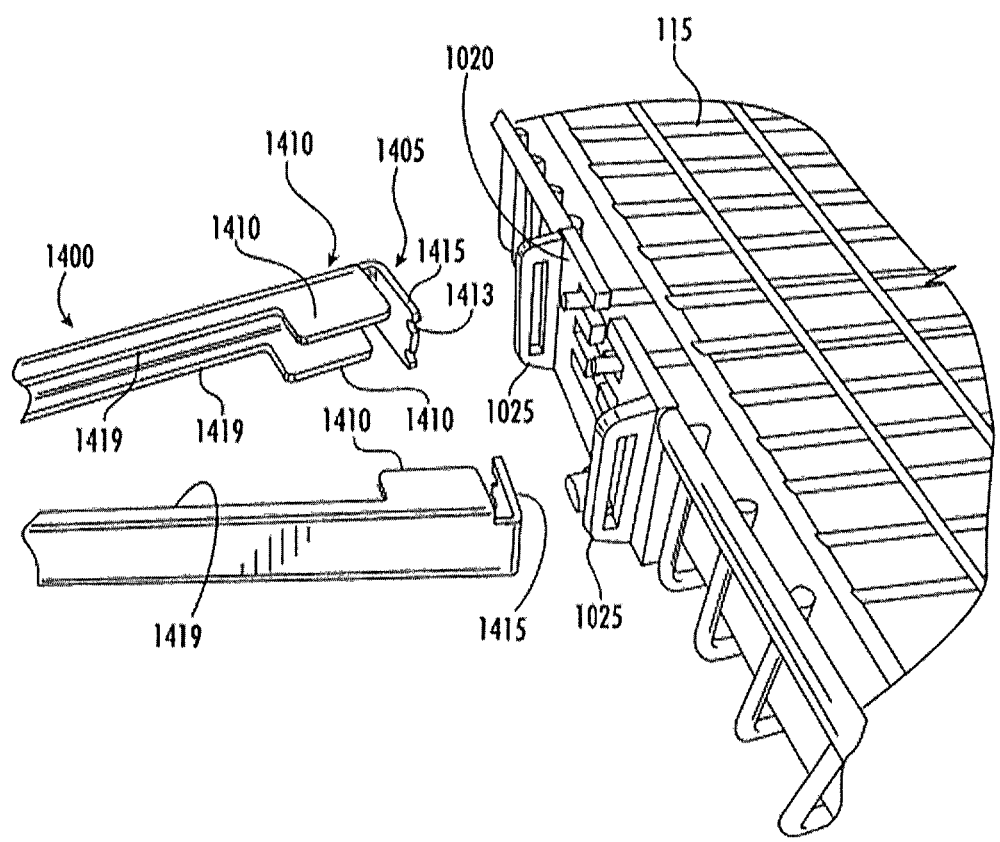
FIG. 16 depicts a perspective view of the tongs from FIG. 15 interacting with the basket from FIGS. 10A and 10B.

FIGS. 15 and 16 shows an alternative embodiment of basket tongs 130 from FIG. 13. In FIGS. 15 and 16, alternative basket tongs 1400 are shown in perspective views interacting with basket 115. Basket tongs 1400 include a first set of basket hooks 1405 and a second set of basket hooks 1410 to help with stability when interacting with basket 115. First set of basket hooks 1405 function in generally the same way as the original first basket hooks 1305; however, First set of basket hooks 1405 include one or more grooves 1413 on the edges of inward-facing plates 1415. Grooves 1413 are used to secure basket manipulation members 1025 when tongs 1400 are in use. Second set of basket hooks 1410 are also modified to extend from both the top and bottom of handles 1417 of tongs 1400. Having hooks 1410 on both sides of handles 1417 helps maintain stability when manipulating basket 115, by gripping basket manipulation members 1025. Tongs 1400 also include elongated support members 1419 that extend along the length of handles 1417. Support members 1419 may extend filly along the length of handles 1417 or partially along the length of handles 1417. Support members 1417 add additional strength and rigidity to tongs 1400.

Figure 17:
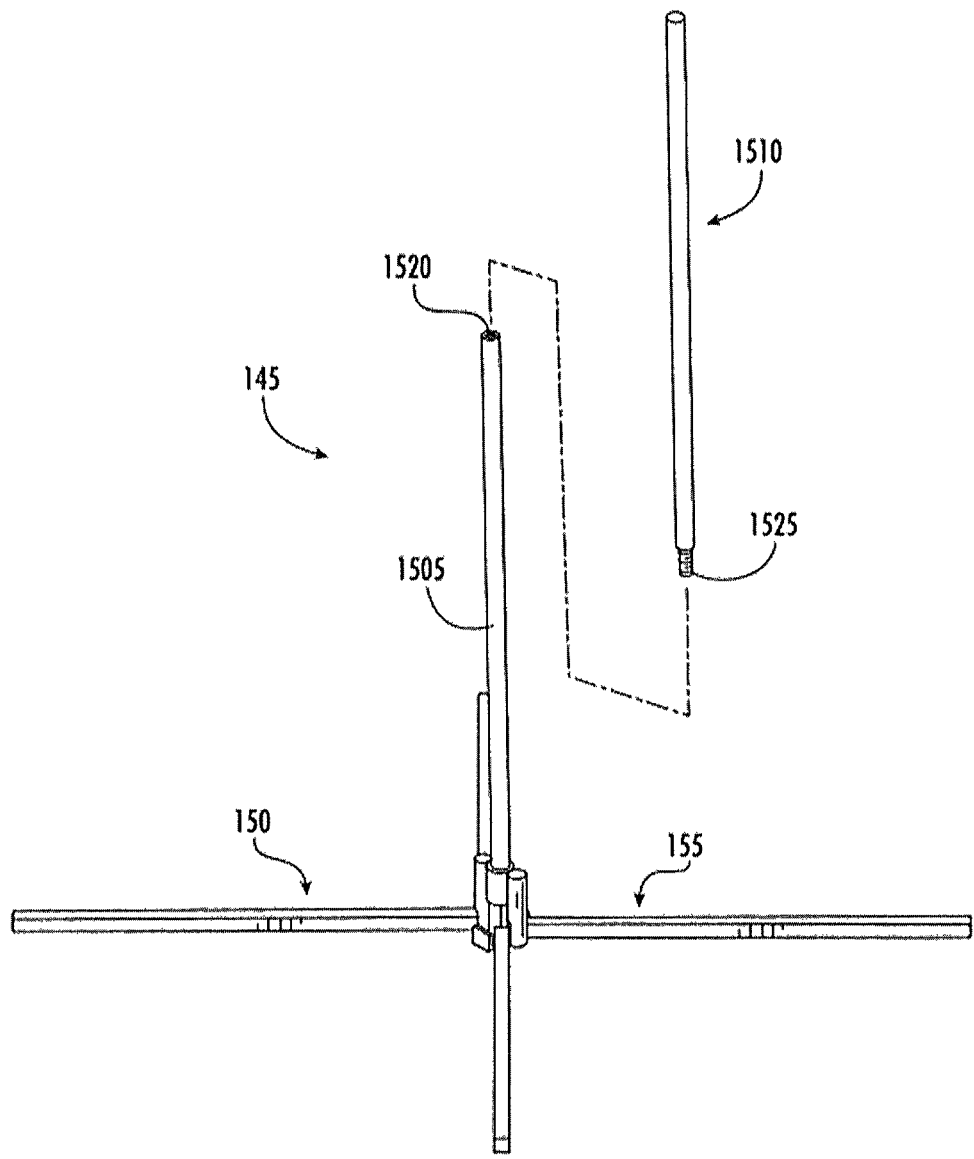
FIG. 17 depicts a perspective view of an alternative embodiment of the exemplary articulating outdoor grill from FIG. 1.
Figure 18:
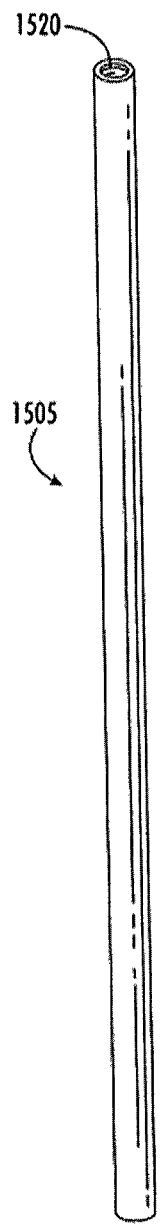
FIGS. 18, 19, and 20 depict front perspective views of an alternative embodiment of the central post used in the articulating outdoor grill from FIG. 1.
Figure 19:
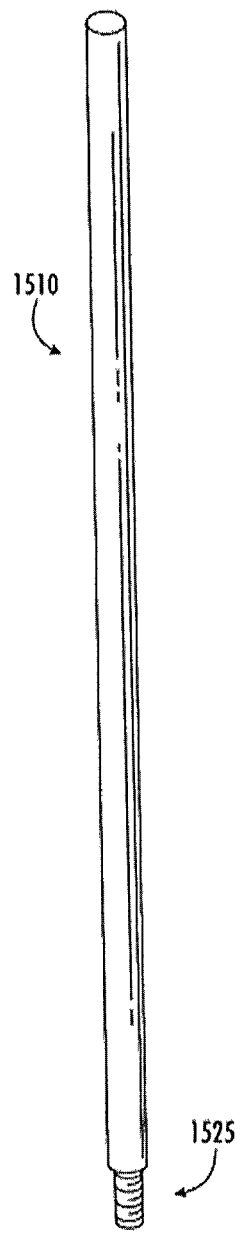
Figure 20:
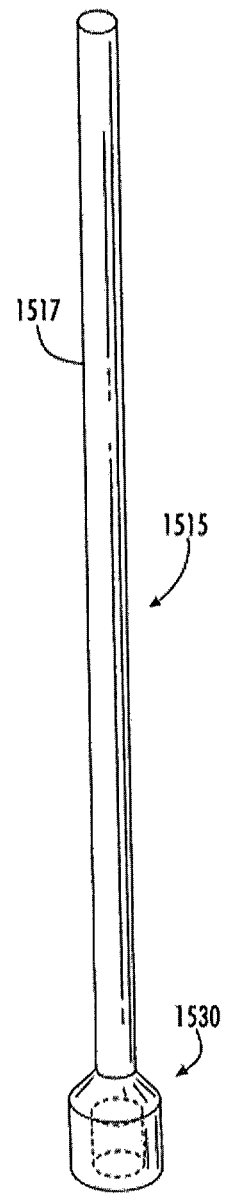

FIG. 17 shows an alternative embodiment of central post 145, in which the height of central post is adjustable, and in which central post 145 is a multi-piece member. In this embodiment, central post 145 includes a lower threaded post 1505 having a threaded counterbore 1520 on a top thereof, and an upper threaded post 1510 having a threaded post 1525 at a lower end thereof that screws into lower threaded post 1505. Once inserted, lower threaded post 1505 and upper threaded post 1510 are stably connected and are able to support basket 115 and/or other attachments. It will be appreciated that other means for adjusting the height of central post 145 may be utilized, such as telescoping rods, hinged rods, sliding rods, etc. FIG. 18 shows a perspective view of lower threaded post 1505 and FIG. 19 shows a perspective view of upper threaded post 1510. In FIG. 20, another embodiment of central post 145 is illustrated. In this embodiment, central post 145 is replaced by one or more post members 1515. Post member 1515 includes an elongated rod portion 1515 and a larger circumference portion 1530. Each rod portion 1515 is configured to fit into a corresponding larger circumference portion 1530. This configuration allows multiple post members 1515 to be utilized. Larger circumference portions 1530 may include one or more set screws to aid in securing multiple rod portions 1515 together.

Figures 21, 22, 23:
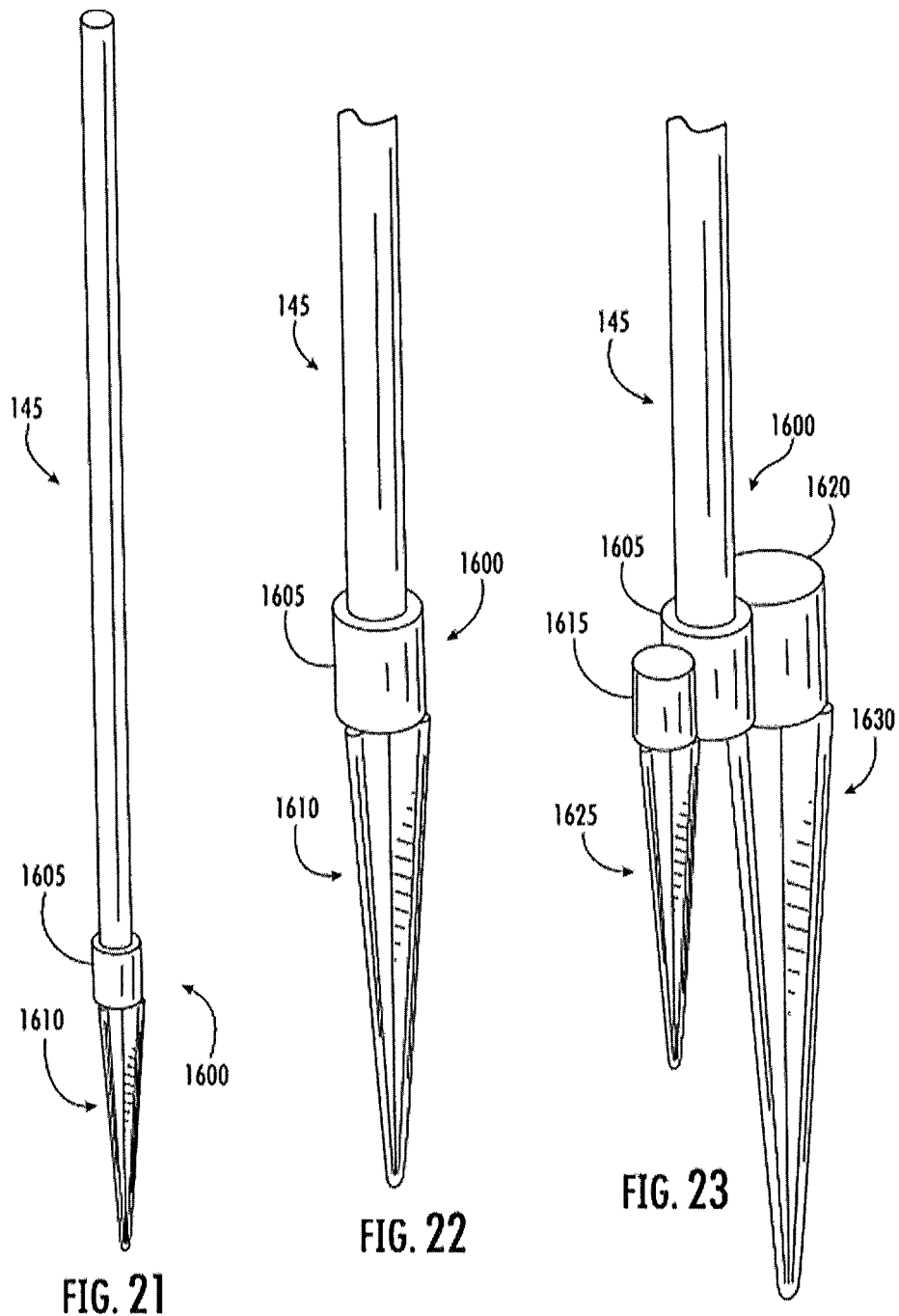
FIGS. 21, 22, and 23 depict front perspective views of an alternative embodiment of the support members used in the articulating outdoor grill from FIG. 1.
Figure 25:
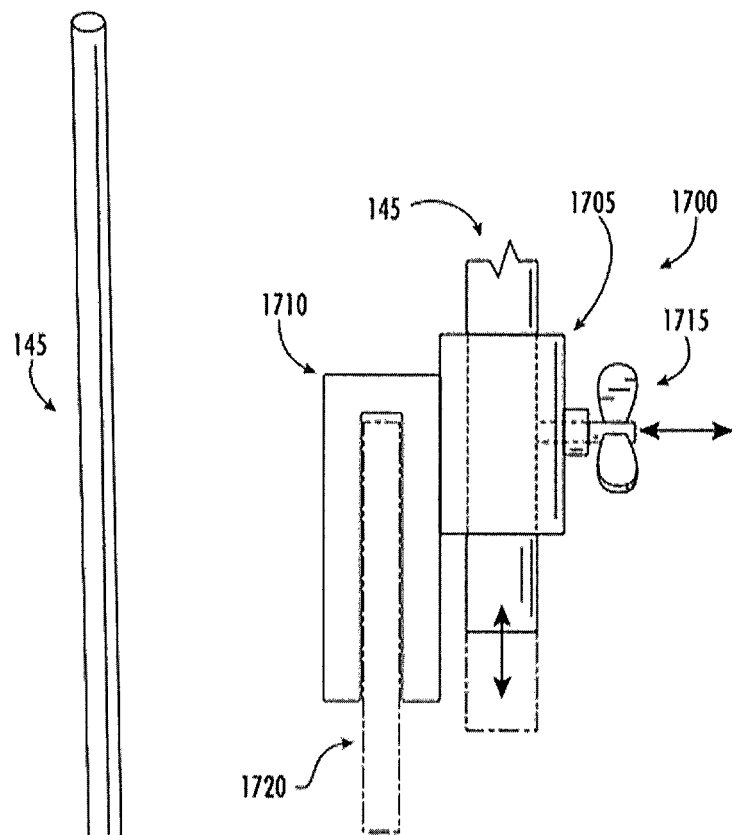
FIG. 25 shows a side view of the alternative embodiment of the support members from FIG. 24.
Figure 24:
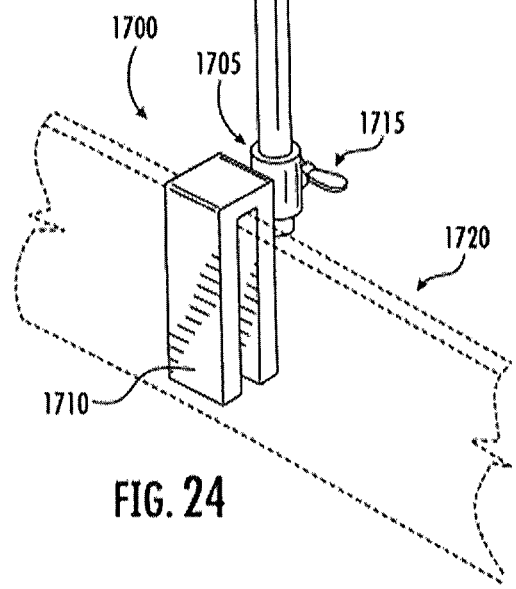
FIG. 24 shows a perspective view of an alternative embodiment of the support members used in articulating outdoor grill from FIG. 1.
Figure 26:
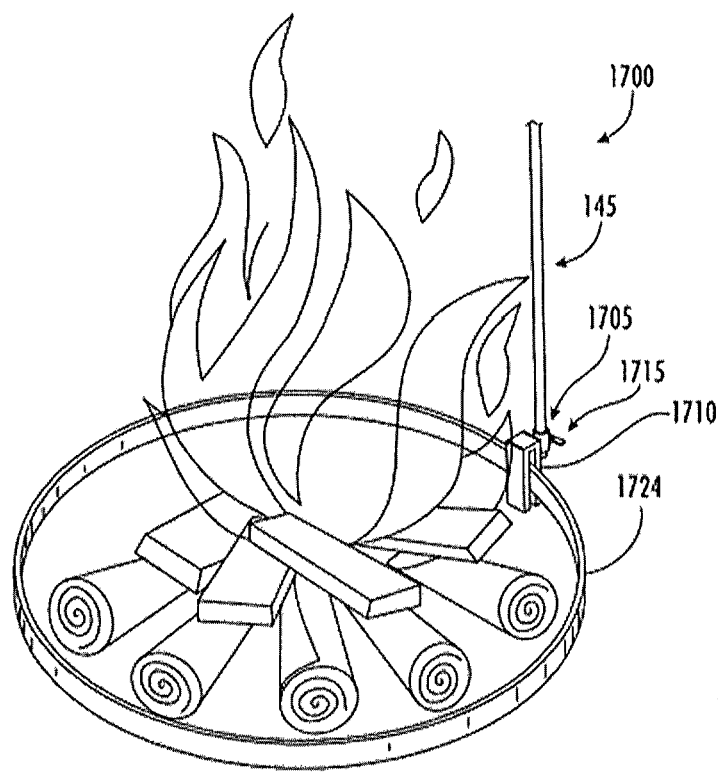
FIGS. 26 and 27 show a perspective view of the alternative embodiment of support members from FIG. 24 in use to attach to other objects.
Figure 27:
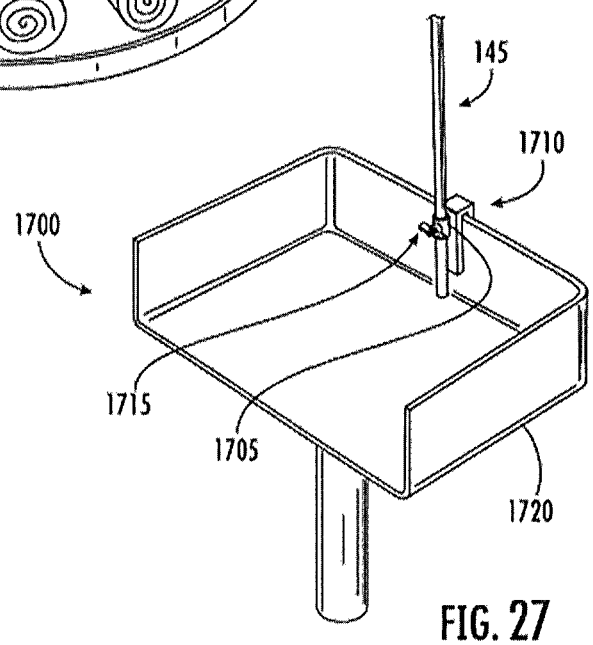

FIGS. 21 and 22 show a close up view of an alternative embodiment of the detachable support system from FIG. 11. In this embodiment, support members 150 and 155 are replaced by a stake assembly 1600. Stake assembly 1600 includes a protrusion 1610 and an insert receiver 1605. Receiver 1605 is sized and shaped to snuggly receive central post 145. FIG. 23 depicts another alternative to the support system from FIG. 11. In this embodiment, stake assembly 1600 includes two protrusions 1615 and 1620. This configuration adds additional stability to central post 145 and helps prevent central post 145 from undesirable rotation.

FIGS. 24-27 depict another embodiment of support system from FIG. 11. In this embodiment, support members 150 and 155 are replaced by a clamping system 1700. Clamping system 1700 includes a cylindrical sleeve 1705, a clevis hook 1710, and a clamp 1715. Cylindrical sleeve 1705 is configured such that central post 145 may slide within cylindrical sleeve 1705, so as to alter the height of central post 145 relative to clamping system 1700. Clamp 1715 is attached to cylindrical sleeve 1705. Once central post 145 is located at a desired height relative to cylindrical sleeve 1705, clamp 1715 may be tightened to secure central post 145 in the desired position. Clevis hook 1710 is configured to fit over the edge of another object, such as a barbeque pit 1720 or a fire ring 1724 at a campsite. Clevis hook 1710 may also include a clamping mechanism similar to clamp 1715.

Figure 28:
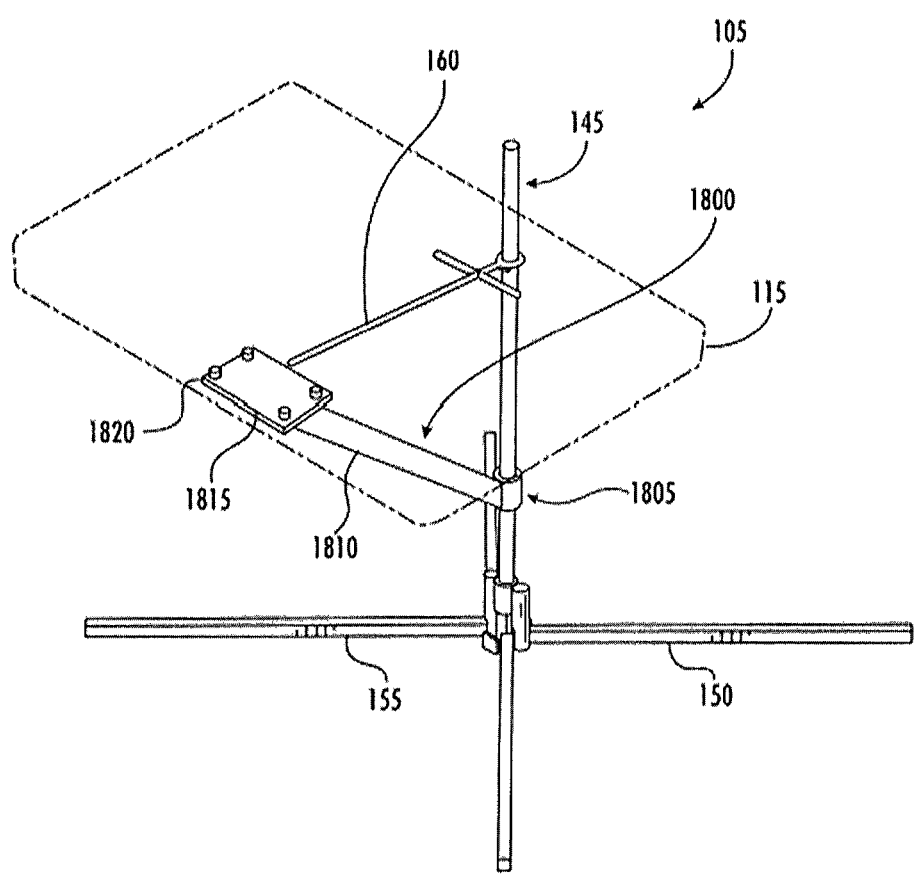
FIG. 28 shows a perspective view of an alternative embodiment of the basket support members.
Figure 29:
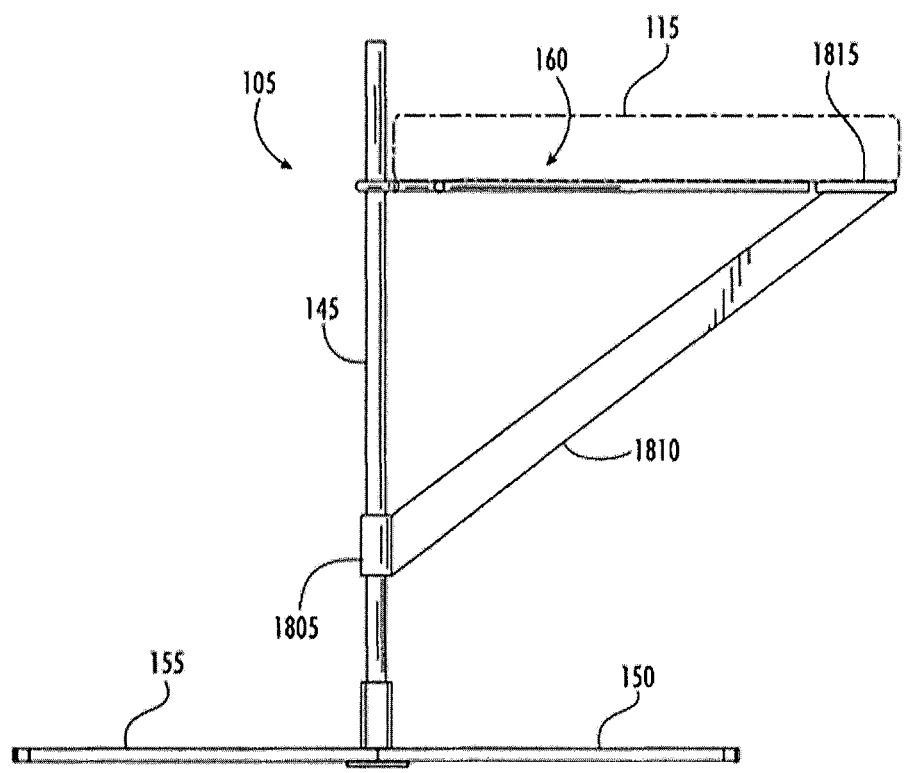
FIG. 29 shows a side view of an alternative embodiment of the basket support members.

FIGS. 28 and 29 depict an alternative embodiment of articulating outdoor grill 105. In this embodiment, one or more support struts 1800 are utilized to add additional support to basket assembly 115. Support strut 1800 includes a sleeve 1805, a support arm 1810, a plate 1815, and plate attachments 1820. Sleeve 1805 is configured to be slidingly disposed over central post 145. Sleeve 1805 is disposed at one end of support arm 1810 and plate 1815 is disposed at the other end of support arm 1810. Support arm 1810 is coupled to sleeve 1805 at an angle of about 45 degrees. Plate 1815 is configured to releasably attach to and support basket 115. Plate attachments 1820 aid in keeping basket assembly 115 from rotating relative to support arm 1810. Support strut 1800 allows basket assembly 115 to carry more weight. It will be appreciated that multiple basket assemblies 115 and/or multiple support struts 1800 may be used with grill 105.

Figure 30:
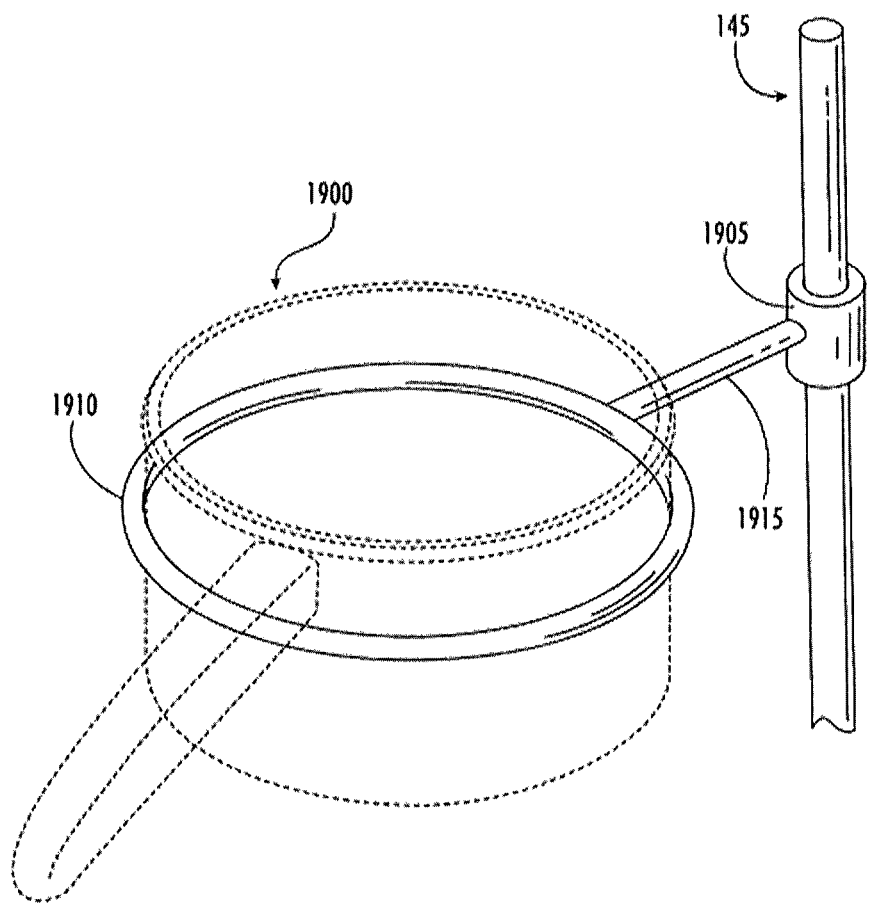
FIG. 30 shows a perspective view of an alternative embodiment of the basket member.

FIG. 30 depicts a ring accessory 1900 that may be used with grill 105. Ring accessory 1900 includes a post attachment 1905, an attachment arm 1915, and a ring support 1910. Post attachment 1905 is attached to one end of attachment arm 1915 and ring support 1910 is attached to the other end of attachment arm 1915. Post attachment 1905 is configured such that post attachment 1905 may slide along central post 145, so as to alter the height of post attachment 1905 along the length of central post 145. Ring support 1910 may be used to hold pots, pans, and other cooking utensils over the fire. It will be appreciated that ring accessory 1900 may be used with conventional pots, pans, and cooking utensils, or ring accessory 1900 may be sized, shaped, and configured to mate with custom sized and shaped pots, pans, and other cooking utensils. As such, ring accessory may include tabs, pins, handles, etc. that mate with such custom sized and shaped pots, pans, and other cooking utensils. Ring accessory 1900 may be used with or without basket assembly 115, and with or without support strut 1800.

Although various embodiments have been described with reference to the figures, other embodiments are possible. For example, although an exemplary system has been described with reference to the figures, other implementations may be deployed in other industrial, scientific, medical, commercial, and/or residential applications. For example, in various embodiments the articulating outdoor grill may be advantageously configured for use in drying food, smoking food, chilling food, freezing food, or some combination thereof. In various embodiments, a basket member, other than basket 115, may be configured to receive and/or process objects other than food (e.g., clay, art projects, industrial components).

In various embodiments, other accessories may be utilized. For example, various accessories may be provided with support elements for slidable and rotatable engagement with a support. Such accessories may include grilling trays, light attachments, pot hooks, Dutch ovens, baking trays, skewers, and extension arms for holding items, such as fish, bacon, pasta, clothing, etc. In various embodiments, accessories may, for example, be provided for use in conjunction with other accessories, such as basket assembly 115. A grilling tray may be provided and configured to be disposed within a basket assembly 115. Such grilling tray may enable basket assembly 115 to be used for cooking vegetables, s'mores, and other foods.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

I claim:

1. A articulating outdoor grill, comprising:
    a central post;
    a detachable support system for supporting the central post; and
    a basket assembly, comprising:
        a basket lid;
        a set of coupling features;
        a latching plate coupled to a front surface of the basket;
        a configuration of basket support members; and
        a set of manipulation features;
        wherein the basket assembly is configured to be adjustably carried by the central post;
        wherein the basket assembly is configured to be slidingly disposed over the central post, such that the position of the basket assembly relative to the central post may be selectively adjusted;

wherein the latching plate is disposed between a left manipulation feature and a right manipulation feature; and wherein the basket lid is provided with left rear protruding engagement member and right rear protruding engagement member, each configured to interact with the set of coupling features.

2. The articulating outdoor grill of claim 1, wherein the support system comprises:

an upper support member;

a lower support member;

an engagement member disposed on one end of the central post to prevent the upper support member and the lower support member from rotating relative to each other.

3. The articulating outdoor grill of claim 2, wherein the upper support member and lower support member are configured to engage and interlock with each other.

4. The articulating outdoor grill of claim 1, wherein the support system comprises:

one more stake assemblies configured to receive and support the central post.

5. The articulating outdoor grill of claim 4, wherein the one or more stake assemblies are configured for sliding engagement with the central post.

6. The articulating outdoor grill of claim 1, wherein the support system and the central post are configured to break down, so as to be stored within the basket assembly.

7. The articulating outdoor grill of claim 1, wherein the basket assembly is formed from a metallic material.

8. The articulating outdoor grill of claim 1, further comprising:

a basket support configured to rotatably and slidably engage to the central post.

9. The articulating outdoor grill of claim 8, wherein the basket support comprises:

a locking member disposed on an underside thereof and positioned to engage a surface of the central post when a downward force is applied to the basket support.

10. The articulating outdoor grill of claim 8, wherein the basket support comprises:

first and second lateral support members.

11. The articulating outdoor grill of claim 1, wherein the height of the central post is adjustable.

12. The articulating outdoor grill of claim 11, wherein the central post is a multi-piece post.

13. The articulating outdoor grill of claim 11, wherein one piece of the central post is threadingly connected to another piece of the central post.

14. The articulating outdoor grill of claim 1, wherein the central post is coupled to the support system by a clamping system.

15. The articulating outdoor grill of claim 1, further comprising:

a support strut for supporting the basket assembly.

16. The articulating outdoor grill of claim 1, further comprising:

a ring accessory configured for supporting a cooking object, the ring accessory being configured to be adjustably carried by the central post, the ring accessory being configured to be slidingly disposed over the central post, such that the position of the ring assembly relative to the central post may be selectively adjusted.

17. The articulating outdoor grill of claim 1, further comprising:

basket tongs configured for grasping and manipulating the basket assembly.

* * * * *